United States Patent [19]
Narita

[11] 4,052,522
[45] Oct. 4, 1977

[54] BICYCLE MUDGUARD

[75] Inventor: Koji Narita, Nagoya, Japan

[73] Assignee: Inoue Gomu Kogyo Kabushiki Kaisha, Nagoya, Japan

[21] Appl. No.: 326,098

[22] Filed: Jan. 23, 1973

[30] Foreign Application Priority Data

Aug. 2, 1972  Japan .................... 47-091324[U]

[51] Int. Cl.² .............. B60R 19/00; B32B 15/04; B62B 9/16

[52] U.S. Cl. .............. 428/31; 280/154.5 A; 293/1; 428/68; 428/131; 428/174; 428/192; 428/203; 428/209; 428/457; 428/463; 428/464; 428/521; 428/522

[58] Field of Search ............ 280/154.5 A, 152 B; 161/217, 213, 218, 220, 165; 428/31, 131, 464, 463, 521, 522, 209, 203, 192, 68, 174, 457; 293/1

[56] References Cited

U.S. PATENT DOCUMENTS

| | | | |
|---|---|---|---|
| 3,290,203 | 12/1966 | Antonson | 161/217 |
| 3,440,129 | 4/1969 | Anselm | 293/1 |
| 3,525,088 | 8/1970 | Thummel | 428/31 |
| 3,582,452 | 6/1971 | Britton | 161/213 |
| 3,586,594 | 6/1971 | Stolki | 161/217 |
| 3,681,180 | 8/1972 | Kent | 428/461 |
| 3,687,794 | 8/1972 | Shanok | 161/213 |
| 3,719,551 | 3/1973 | Radtke | 161/213 |
| 3,734,783 | 5/1973 | McDonald | 161/218 |
| 3,745,056 | 7/1973 | Jackson | 428/159 |
| 3,914,482 | 10/1975 | Sawa | 428/31 |

FOREIGN PATENT DOCUMENTS

| | | | |
|---|---|---|---|
| 1,903,705 | 8/1970 | Germany | 161/213 |
| 1,043,210 | 9/1966 | United Kingdom | 161/213 |

*Primary Examiner*—Ellis Robinson
*Attorney, Agent, or Firm*—Brisebois & Kruger

[57] ABSTRACT

A bicycle mudguard comprising a rigid substrate made of a synthetic resin material having good weather resistance, strength and rigidity, a surface layer of synthetic resin material having good weather resistance, and an intermediate layer disposed between said surface layer and substrate.

4 Claims, 7 Drawing Figures

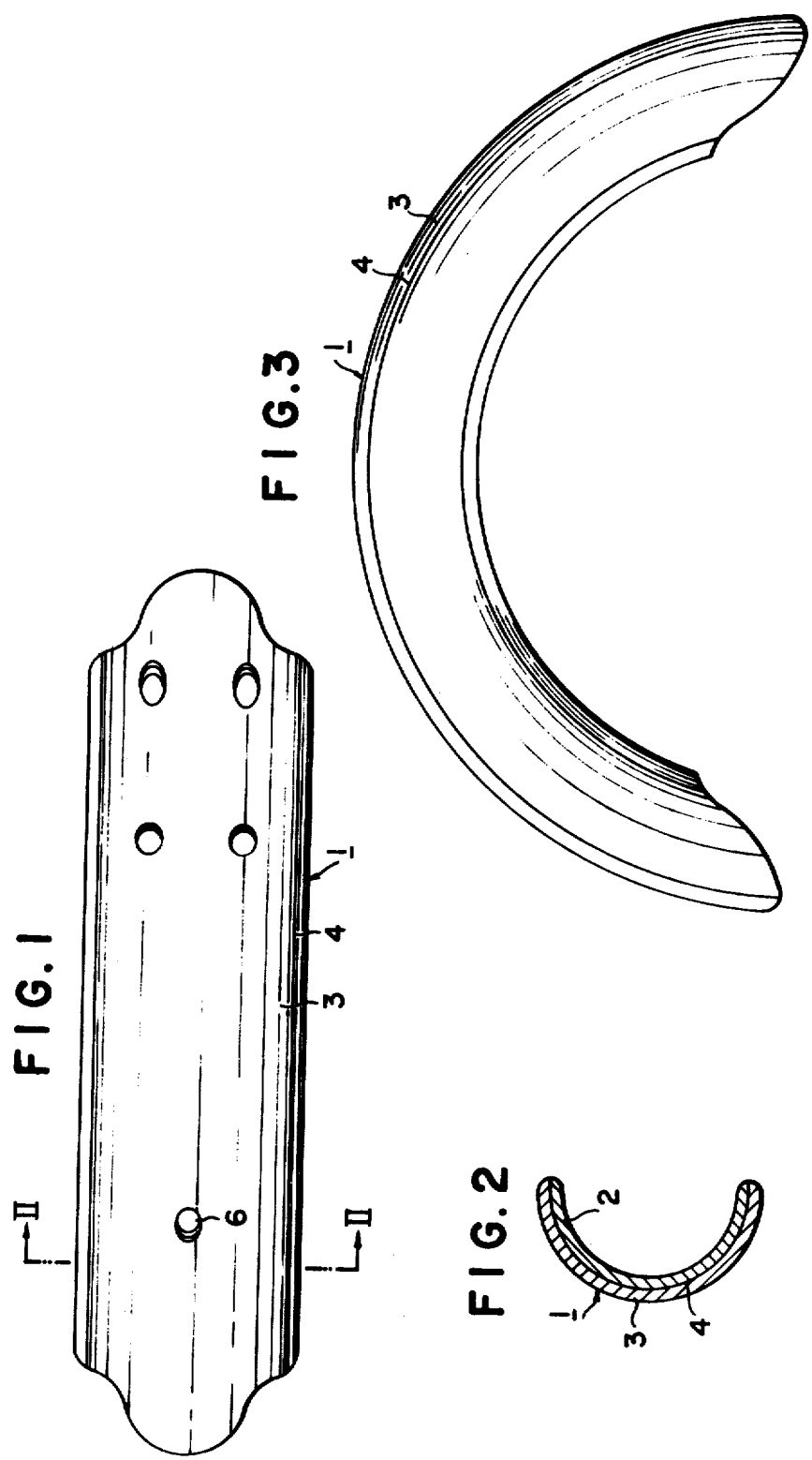

BICYCLE MUDGUARD

BACKGROUND OF THE INVENTION

1. Field of the Invention

This invention relates to a bicycle mudguard made of a synthetic resin material.

2. Description of the Prior Art

Bicycle mudguards comprising a steel plate and a coating of plated metal or paint formed thereon have heretofore been used. However, the weight of the steel plate used as a substrate is substantial and there is a certain limit beyond which the weight of a bicycle mudguard having a steel plate as a substrate cannot be decreased. Furthermore, defects in the metal-plated or paint-coated surface, or scars in the metal-plated or painted surface caused by contact or collision of a mudguard with obstacles tend to rust when exposed to air or rainwater, and this results in extreme discoloration of the mudguard surface. Moreover, the steel plate, per se, is corroded by this rust.

SUMMARY OF THE INVENTION

This invention relates to a bicycle mudguard which can overcome the foregoing defects of conventional mudgurads.

A primary object of this invention is to provide a light-weight bicycle mudguard which is composed of a synthetic resin material.

Another object of this invention is to provide a bicycle mudguard made of a synthetic resin material the appearance of which can be constantly maintained at a high level for a long period of time.

A further object of this invention is to provide a bicycle mudguard in which discoloration of the colored surface can be substantially prevented.

Other objects and advantages of this invention will be apparent from the following description of a preferred embodiment thereof, with reference to the accompanying drawings, in which:

FIG. 1 is a plan view illustrating the bicycle mudguard of this invention;

FIG. 2 is a sectional view taken along the line II—II of FIG. 1;

FIG. 3 is a side view illustrating the bicycle mudguard according to the present invention;

Figure 4:
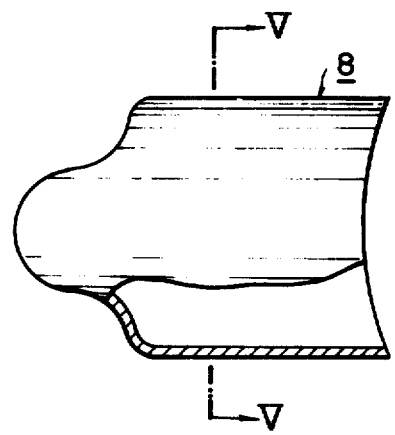
FIG. 4 is a plan view illustrating a part of the bicycle mudguard according to the present invention which may be used to form a joint.

As illustrated in FIGS. 1 to 3, a bicycle mudguard 1 according to this invention has the following three-layer structure: The mudguard 1 comprises a substrate layer 2 made of a rigid synthetic resin material, which need not be highly weather resistant, such as an ABS (acrylonitrile-butadiene-styrene) resin, into which weatherproof pigments, dyes, additives, etc., have been incorporated, a surface layer 3 of a thickness of 500 to 1200μ made of a transparent synthetic resin material such as CAB resin (cellulose-acetate-butyrate resin) and vinyl chloride resin, into which such additives as transparent pigments, transparent dyes and ultraviolet absorbers have been incorporated, and an intermediate layer 4 having a thickness of 20 to 100μ between layers 2 and 3. This intermediate layer 4 consists of a synthetic resin material plated with a metal foil such as Al foil or having an evaporatively deposited coating of such metal as Al, Au and Ag, which forms a lustrous embossed, linear, spot-like or three-dimensional pattern on the surface of the intermediate layer. As is illustrated in FIGS. 2 and 3, the mudguard 1 has an arc-like section and is curved in the longitudinal direction. Holes for attaching the mudguard 1 to a bicycle 5 are provided at appropriate points on the mudguard 1.

Preferable components of a mudguard according to this invention will now be described.

Carbon (black), titanium white (white), calcium carbonate (white), Indian red (red), cadmium pigment (yellow to orange), etc. may be used as the weatherproof pigment. Amount the suitable weatherproof additives are such ultraviolet absorbers as salicylic acid type absorbers (e.g., p-octylphenyl salicylate), benzophenone type absorbers (e.g., 2-hydroxy-4-octoxybenzophenone and 2,2'-dihydroxy-4,4'-dioctoxybenzophenone) and benzotriazole type absorbers [e.g., (2-hydroxy-5-methylphenyl) benzotriazole].

Figure 5:
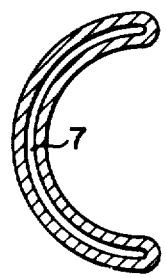
FIG. 5 is a sectional view taken along the line V—V of FIG. 4.

The bicycle mudguard 1 of this invention may be prepared in any of the following ways: (A) Extrusion molding. In this method substrate layer 2, intermediate layer 4 and surface layer 3 are extruded in one die to form a three-layer structure. (B) Compression molding. In this method substrate layer 2 and surface layer 3 are molded separately, intermediate layer 4 is positioned between these two layers and the assembly pressed together. (C) Injection molding. In this method either substrate layer 2 or surface layer 3 and intermediate layer 4 are molded together in advance, and the molded article is then integrated with the remaining substrate layer 2 or surface layer 3. When the above three-layer structure is molded by the extrusion molding method, the intermediate layer is exposed at both ends of the bicycle mudguard, as illustrated in FIGS. 1 and 3. Therefore, as illustrated in FIGS. 4 and 5, end covers 8 molded from a synthetic resin material which may be the same as the synthetic resin material of substrate layer 2 or surface layer 3, or different from such resin, and having a suitable configuration fit on both ends of the bicycle mudguard 1, and are integrated with both ends of the bicycle mudguard 1 by bonding, ultrasonic welding or high frequency welding, so that the formation of rust on the intermediate layer due to air-exposure can be prevented. This end cover 8 may also be used to ornament both ends of the bicycle mudguard 1.

Figure 6:
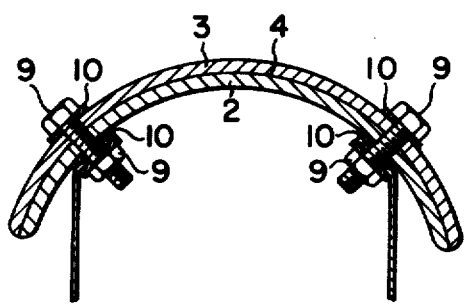
FIG. 6 is a view illustrating the method of attaching the mudguard of the present invention to a bicycle.
Figure 7:
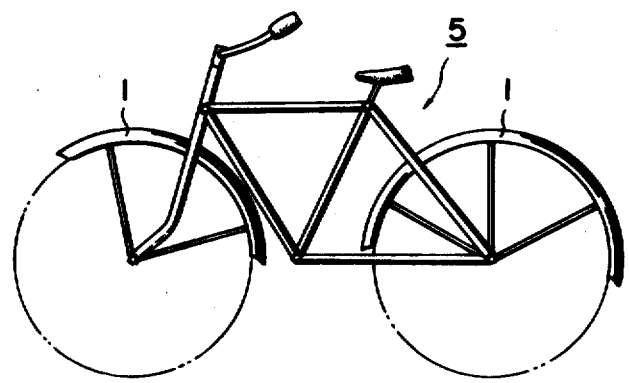
FIG. 7 is a view showing the mudguard according to the present invention attached to a bicycle.

As illustrated in FIGS. 6 and 7, the bicycle mudguard 1 may be easily attached to a bicycle proper 5 by inserting bolts into holes 6 through washers 10 of rubber of the like and fastening the bolts with nuts 9.

As described above, a synthetic resin material having the required strength and rigidity, such as an ABS resin, is colored with a weatherproof pigment, dye or additive, to improve the weather resistance of the substrate layer 2. Furthermore, by adjusting the thickness of the intermediate layer 4 to between 20 and 100μ, all the rays passing through the surface layer 3 are reflected from the surface of the intermediate layer 4 and do not reach the substrate layer 2. Therefore, the substrate layer 2 is protected from photodegradation. Furthermore, the thickness of the surface layer 3 is adjusted to between 500 and 1200μ to protect the colors and patterns of the intermediate layer 4. When the surface layer 3 is too thin, a synthetic resin material constituting the surface layer 3 such as CAB resin (cellulose-acetate-butyrate resin) and vinyl chloride resin, tends to undergo degradation owing to cracks formed on the surface. However, if the thickness of the surface layer 3 is restricted within the above range and a weatherproof pigment, dye, ultraviolet absorber or the like is incorporated into such resin material, no great discoloration or color fading occurs in the intermediate layer 4, and a beautiful appearance can be maintained for a very long period of time. Furthermore, since a synthetic resin material having good rigidity is used for the substrate layer 2 and this substrate layer supports the intermediate layer 4 together with the surface layer 3 while being shielded from the outer air, no warping or distortion of the bicycle mudguard takes place, even if it is used for a long period of time, and the quality of the bicycle mudguard can be constantly maintained. Moreover, since the bicycle mudguard of this invention is light in weight, it is possible to decrease the total weight of the bicycle as a whole.

What is claimed is:

1. A bicycle mudguard comprising:
   a substrate layer of an acrylonitrile-butadiene-styrene resin having the strength and rigidity required of such mudguards;
   a surface layer of at least one transparent, weather resistant resin selected from the group consisting of cellulose acetate-butyrate and vinyl chloride resins; and
   an intermediate layer having a thickness of 20 to 100 between said surface layer and said substrate layer, said intermediate layer being made of a synthetic resin material covered with a thin substantially continuous coating of fully reflective metallic material which reflects light rays passing through said transparent surface layer.

2. A bicycle mudguard as claimed in claim 1 comprising a weatherproof coloring material incorporated into said surface layer, the thickness of said surface layer lying between 500 and 1200 microns.

3. A bicycle mudguard according to claim 1 wherein said substrate layer is colored with at least one weatherproof material selected from the group consisting of pigments and dyes.

4. A bicycle mudguard according to claim 1, comprising an end cover protecting each of the opposite ends of said mudguard to prevent the reflective metallic coating of said intermediate layer from being exposed to the weather, said end cover being made of the same synthetic resin material as that constituting said surface layer, said end cover being formed with a recess, the cross section of which has the same configuration as that of each end of said mudguard, so that each of the opposite ends of said mudguard is received in one of said recesses.

* * * * *